A. FRIBERG.
Cultivator Teeth.
No. 64,657.
Patented May 14, 1867.
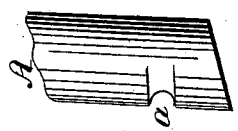
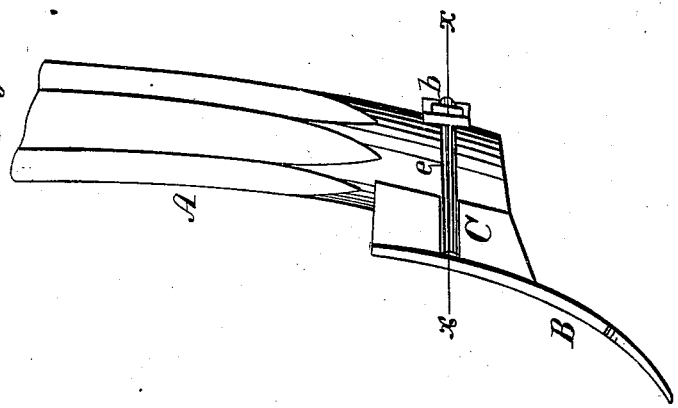
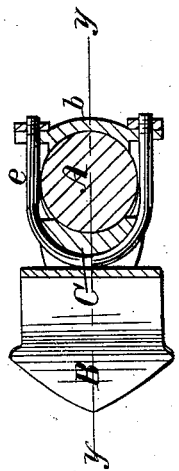
Witnesses.
P. T. Dodge
H. B. Munn
Inventor
Andrew Friberg
By W. C. Dodge
Attys.

United States Patent Office.

ANDREW FRIBERG, OF MOLINE, ILLINOIS.

Letters Patent No. 64,657, dated May 14, 1867.

---

IMPROVEMENT IN CULTIVATORS.

---

The Schedule referred to in these Letters Patent and making part of the same.

---

TO ALL WHOM IT MAY CONCERN:

Be it known that I, ANDREW FRIBERG, of Moline, in the county of Rock Island, and State of Illinois, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

My invention consists in a novel method of attaching the shares or ploughs of cultivators to their stocks, so that said shares or ploughs may be adjusted to turn the furrow or earth to one or the other side, as may be desired.

Figure 1 represents a portion of a stock with the share attached ready for use.

Figure 2 is a transverse section of the same taken on the line $x\ x$ of fig. 1.

Figure 3 is a vertical section of a portion shown detached; and

Figure 4 is a side elevation of the bottom portion of a stock prepared to receive the share.

In cultivators for tilling or cultivating growing crops it is necessary that the shares or ploughs shall be so arranged that they may be inclined to the right or left, in order to throw the earth to or from the growing plants at will, and this is the special object of my present invention.

A represents a portion of one of the stocks to which the shares are attached, of which there are usually not less than four in a cultivator. B represents the share or plough, which may be made in any of the usual forms for this kind of implement. This share B is securely bolted or riveted to a metallic block, C, as represented in figs. 1 and 2. This block C is made concave vertically on its rear side to fit the rounded portion of the stock A, as shown in figs. 2 and 3. About midway of this block C a groove, $c$, is formed in its front face, and extending entirely around its exterior surface at the front and sides, as shown in fig. 3, to receive a bent rod or stirrup, $e$, by which it is secured to the stock A, as shown in figs. 1 and 2. On the interior or concave face of the block C, and corresponding with the groove $c$, a bead or projecting ridge is formed, as shown in fig. 3. On the front side of the stock A, near its lower end, a groove, $a$, is cut transversely of the stock, as shown in fig. 4, into which the bead or projection on the concave face of C fits, when the block C is applied to the stock A, as represented in figs. 1 and 2. A bent rod or stirrup, $e$, is inserted between the share B and the block C, and resting in the groove $c$ extends around on each side of the stock A to the back side of the latter, where a metal yoke, $b$, is placed on the ends of rod $e$ and secured by nuts. By screwing these nuts up tight, the block C is clasped securely to the stock A, and thus holds the share B in place. By loosening the nuts, the block C and share B may be turned to one or the other side, and thus made to throw the earth to or from the plants, as may be desired, and this inclination of the shares may be adjusted to any desired extent. It will also be observed that by this method of securing the share, the end of the stock A is prevented from being split or injured, as it is liable to be when the share is bolted to it by bolts passing through it. The block C may be made of cast iron, and, being cast in a single piece, is cheap and strong.

Having thus described my invention, what I claim is—

Securing the share to the stock by means of the block C and stirrup $e$, when said parts are constructed and arranged substantially as herein shown and described.

ANDREW FRIBERG.

Witnesses:
H. W. CANDEE,
H. E. BARBEE.